United States Patent [19]

Nelson

[11] Patent Number: 4,885,577
[45] Date of Patent: Dec. 5, 1989

[54] PAGING SYSTEM FOR PROVIDING A DATA MESSAGE AND A VOICE MESSAGE TO A UNIQUE ADDRESS OF A PAGING RECEIVER

[75] Inventor: Leonard E. Nelson, Boynton Beach, Fla.

[73] Assignee: Motorola, Inc., Schaumburg, Ill.

[21] Appl. No.: 162,838

[22] Filed: Mar. 2, 1988

[51] Int. Cl.⁴ .............................................. H04Q 1/00
[52] U.S. Cl. ........................... 340/825.44; 340/825.47; 340/825.48
[58] Field of Search ...................... 340/825.44, 825.48, 340/825.52, 311.1; 455/70, 54, 53, 44, 48

[56] References Cited

U.S. PATENT DOCUMENTS 4,424,514 1/1984 Fennell et al. ............. 340/825.44 X
4,427,980 1/1984 Fennell et al. ............. 340/825.47 X
4,477,807 10/1984 Nakajima et al. ........... 340/825.48 X Primary Examiner—Ulysses Weldon
Attorney, Agent, or Firm—William E. Zitelli; Vincent B. Ingrassia

[57] ABSTRACT

A paging system is provided for transferring data and voice messages to a unique address of a paging receiver. The system includes a paging controller, an encoder, a transmitter, and a paging receiver. The paging controller receives voice and data information from an entry device. The encoder, coupled to the paging controller, encodes the voice and data information into a composite paging signal designated for the unique address of the paging receiver. The composite paging signal is transmitted to the paging receiver by the transmitter. The paging receiver receives and decodes the composite paging signal to receive the data and voice messages. The data are displayed simultaneously with the voice message being furnished to the paging receiver used. In one embodiment, a PBX system automatically provides the data message in the form of a telephone number. The paging system automatically provides the telephone number of the sender along with the voice message to the paging receiver user.

19 Claims, 10 Drawing Sheets

U.S. Patent  Dec. 5, 1989  Sheet 1 of 10  4,885,577
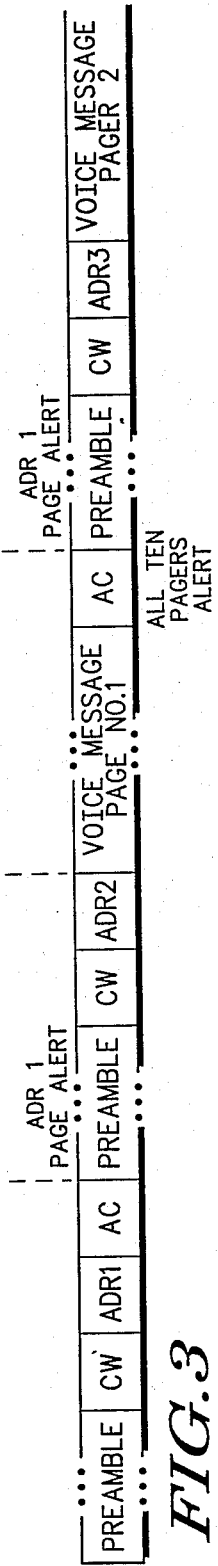
FIG.1
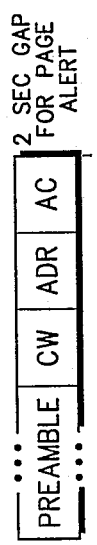
FIG.2 —PRIOR ART—
FIG.3 —PRIOR ART—

PAGING SYSTEM FOR PROVIDING A DATA MESSAGE AND A VOICE MESSAGE TO A UNIQUE ADDRESS OF A PAGING RECEIVER

BACKGROUND OF THE INVENTION

The present invention relates to communication systems and more particularly to a paging system capable of transmitting and receiving data messages simultaneously with voice messages to a unique address of a paging receiver.

BACKGROUND DISCUSSION

Communication systems in general and paging systems in particular have attained widespread use for transmitting information from a central controller to a selected paging receiver. This information has been transmitted using a number of well known paging coding schemes and message formats, such as POCSAG or Golay coding schemes. Over the past few years, the predominant code transmission schemes used to siqnal paging receiver devices have changed from sequential tone based systems to binary coded systems. Also, the services offered to the user have evolved from simple alert only and alert plus voice signalling to more complex multifunction alerting with visual readout of numeric or alphanumeric data.

Modern paging systems and paging receivers in particular have achieved this multifunction capability through the use of microcomputers which allow the paging receiver (pager) to respond to control signals known as selective calling signals that identify the type of information transmitted, such as tone, tone and voice, or a data message. Other features have been the ability of paging receivers to provide a visual indication to the user of the data message and the ability to store the data message to be read at a later time.

Prior to a detailed discussion relating to the structure of the paging system of the present invention, a summary of the operation in general of a typical code transmission scheme, such as the Golay sequential code scheme (GSC), may merit review. While it is clear that many types and formats of coding schemes may be utilized in paging systems and even for the present invention, the preferred embodiment of the present invention utilizes a binary signalling scheme, such as the Golay sequential code. The Golay sequential code is a selective call paging protocol based largely on the current Golay binary paging format. A description of the Golay code may be found in a paper entitled "Selective Signalling for Portable Applications" by Leonard E. Nelson, 28 IEEE Vehicular Technology Conference, Denver, CO, Mar. 22-24, 1978.

The GSC code that uniquely identifies each paging receiver provides four different addresses for the transfer of information to the pager. Each of the four addresses assigned by the GSC code corresponds to a type of information that can be received by the pager (page type). For example, referring to FIG. 1, there is shown part of a pager address plan for the GSC code which has been developed by Motorola for their PMR 2000 paging receiver. In this example, address one corresponds to the pager receiving tone and voice information. Address two corresponds to the pager functioning as a tone only pager. Address three, like address one, receives tone and voice information. Finally, address four corresponds to the paging receiver being capable of receiving data messages. It should be noted that no unique address has existed to provide the capability of receiving together a voice and a data message intended for the same pager. That is, heretofore, there has been no capability for combining voice and data messages in one paging signal to a unique address of a selected paging receiver without wasting valuable transmission time.

One method to solve the waste of transmission time is shown in U.S. Pat. No. 4,424,514 issued to Fennell et al. and assigned to the assignee of the present invention. FIG. 2 is from Fennell and showed the timing diagram for an earlier use of the GSC format for a voice pager. FIG. 2 showed that a preamble code was transmitted followed by a control word and the address of the individual pager. (The preamble, control word, and address are hereinafter collectively referred to as selective calling signals.) The address was followed by an activation code and upon the reception and detection of the activation code, the individually addressed pager commenced two-second voice alert period to warn the paging user to the impending or imminent arrival of a voice message. At the conclusion of the voice message, the inclusion of a deactivation control word resulted in muting the audio channel. As is evident, the two-second voice alert period results in periods of "dead time". It is important to note that this "dead time" was also a result of the inability of the decoder of the paging receiver to decode information while it was alerting.

Recognizing the inability of the selected paging receiver to receive information during its voice alert period, Fennell suggested using the "dead time" of the voice alert period to address other unselected paging receivers. FIG. 3 is a message timing diagram from Fennell which showed this ability. FIG. 3 in sequence showed that the preamble for a first selected pager was followed by the control word, the address and the activation code for the first selected pager. Upon receipt of the activation code, the first selected pager continued with the two-second alert period to warn the pager user that a voice message for the first selected pager was to follow. As shown in FIG. 3, during the two-second voice alert period for the first selected pager, the preamble, control word and second address for a second selected pager were transmitted. At the conclusion of the second address, the transmitter then provided a voice message for the first selected pager. However, as seen, the two-second voice alert period for the first selected pager could only be used to transmit additional information to other pagers. Therefore, it would be extremely beneficial if within the voice alert period additional information for the first selected pager could be transmitted.

Additional benefit would be obtained if this information could further include alphanumeric information, such as a telephone number, with a voice message. This type of combination would be extremely useful to a user because it would provide a record of essential data, the telephone number, as well as allowing the receiving party to recognize the sender's voice and determine the urgency of the message. This would also benefit a user who has placed the pager into a silent mode (no alert or voice message is furnished) by making a record of the telephone number of the sender. Finally, a substantial benefit would be available to a paging receiver user with the increased use of intelligent PBX systems that automatically provide the sender's telephone number.

SUMMARY OF THE INVENTION

The present invention has been developed for the purpose of transmitting a voice message with a data message to a unique address of a paging receiver. Accordingly, the invention has as one of its objects a paging system for transmitting the voice message and the data message to the unique address of the paging receiver without increasing the transmission time.

Another advantage of the present invention is to transmit a data message to a selected voice paging receiver during the alert period of the selected pager.

Another advantage of the present invention is to provide a pager with the ability to furnish voice information simultaneously with pertinent data information.

Another benefit of the present invention is to automatically display the telephone number of a paging system user to the user of a voice pager.

In general, there is shown a paging system for transferring information to a paging receiver. The paging system includes a paging receiver and a central controller having a transmitter. The central controller includes a paging controller for receiving voice and data information intended for the pager from an entry device such as a PBX system or a telephone. An encoder responsive to the paging controller encodes the voice and data information into corresponding voice and data messages. The voice and data messages are combined into a composite paging signal designated for a unique address of the paging receiver. The composite paging signal includes selective call signals, followed by the data message and the voice message. The composite paging signal is transferred to a transmitter which transmits the signal to the selected paging receiver. The paging receiver includes a receiving means, a decoding means, a processing means, a display means, and a speaker means. The receiving means receives the uniquely addressed composite paging signal and transfers the composite paging signal to the decoding means. The decoding means recovers the data message and voice message from the composite paging signal. The processing means receives the data message and voice message to generate an alphanumeric information signal and a voice information signal. The display means being responsive to the alphanumeric information signal visually displays alphanumeric characters corresponding to the alphanumeric information signal. The speaker means being responsive to the voice information signal produces audible sounds corresponding to the voice information signal.

In a first embodiment according to the present invention, a voice/data message format for the composite paging signal includes an activation code for notifying the processing means of the start of the data message and a deactivation code for notifying the processing means of the end of the voice message. In this embodiment, the voice message can be of variable length. In a second embodiment of the present invention, the voice message is sent during a predetermined voice period.

BRIEF DESCRIPTION OF THE DRAWINGS

The foreground aspects and other features of the invention are explained in the following description, taken in conjunction with the accompanying drawings, wherein:

FIG. 1 shows a prior art address plan for a paging receiver using the Golay sequential code.

FIG. 2 is a prior art diagram from Fennell showing the timing diagram for an earlier use of the Golay sequential code format for a voice paging receiver.

FIG. 3 is a prior art message diagram from Fennell which shows using the dead time of the voice alert period for a voice pager to address other unselected paging receivers.

DETAILED DESCRIPTION OF A PREFERRED EMBODIMENT

In order to best illustrate the utility of the present invention, it is described in conjunction with a communication receiver, such as a paging receiver, capable of receiving and decoding paging information, the paging information including selective call signals, a data message, and a voice message for a unique address of a multi-addressable paging receiver. While the present invention is described hereinafter with particular reference to a paging system, it is to be understood at the outset of the description which follows, it is contemplated that the apparatus and method in accordance with the present invention may be used with numerous other communication systems. The paging receiver herein described is associated with a paging system having a central controller for encoding the paging information, the paging receiver responds to control and data information from the central controller, and in turn, stores and provides data and voice messages to a user during operation.

Figure 4:
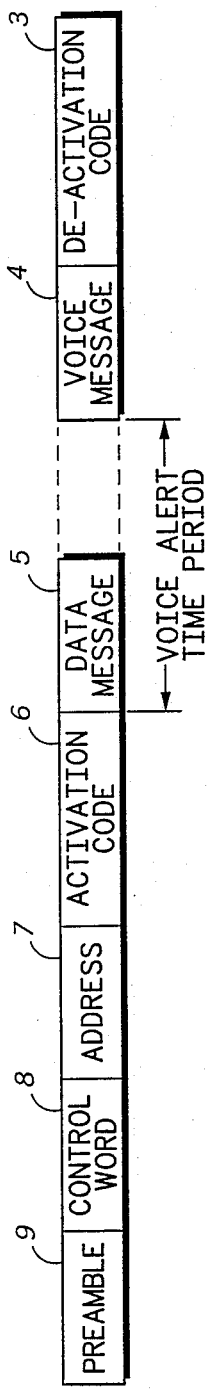
FIG. 4 is a message timing diagram according to the present invention illustrating the use of the voice alert period for transmitting a data message to a paging receiver that has been previously selected for receiving a voice message.

Referring to FIG. 4, there is shown a message timing diagram for a first embodiment of the present invention showing the advantages of a voice/data message format for the composite aging signal. The voice alert time period is used to transmit data messages to the selected paging receiver. FIG. 4 in sequence shows a preamble 9 followed by a control word 8, an address 7 used to select the paging receiver, and an activation code 6. Upon receipt of the activation code 6, the selected paging receiver goes into a predetermined voice alert time period to warn the paging receiver user that a voice message is to follow. Normally, for such tone and voice systems as previously explained, no utilization has been made of the voice alert time period to transmit information to the selected paging receiver. Thus, there is a predetermined time period during which additional information, such as a data message 5, can be transmitted to the selected paging receiver. As may be seen in FIG. 4, during the voice alert time period, the data message 5 can be transmitted to the selected paging receiver. At the conclusion of the voice alert time period, there follows a variable length voice message 4 for the selected paging receiver.

At the conclusion of the variable length voice message 4, a deactivation code 3 is transmitted signifying the end of the voice message. The transmission of the deactivation code 3 terminates the broadcasting of the voice message. During the transmission of the voice message, the data message having been previously received during the voice alert time period, can be displayed upon a display of the paging receiver.

Figure 5:
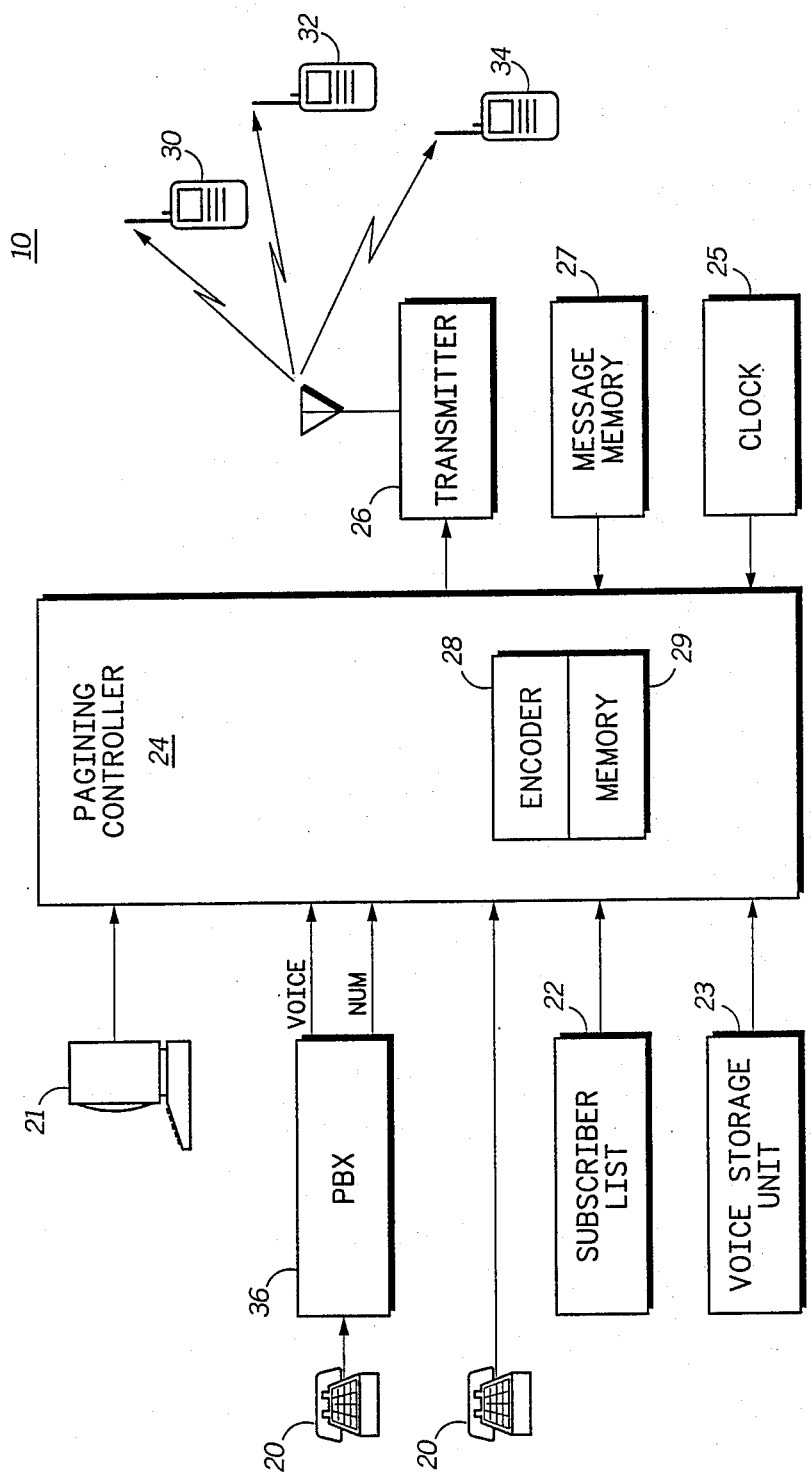
FIG. 5 is a block diagram showing a central controller according to the present invention for transmitting the message format of FIG. 3.

Referring now to FIG. 5, there is shown a central controller 10 according to the present invention which is able to transmit voice and data information to a selected paging receiver out of a plurality of paging receivers. A plurality of entry devices, such as telephone 20 and video display unit (VDU) 21, are connected to central controller 10 which includes paging controller 24 and is connected to a transmitter 26. The operation of the telephone 20 and VDU 21 with the paging controller 24 are well known to those of ordinary skill in the art. Additionally, a PBX system 36 can be used as an interface between telephone 20 and paging controller 24. The PBX system 36, such as SLI VLE manufactured by Northern Telecom, can automatically identify the telephone number of the telephone 20. This number can be automatically provided to the paging controller to enable the paging controller to automatically provide the telephone number to a paging receiver user. The paging controller 24 further includes an encoder 28 having a program memory 29. The encoder combines data and voice messages for a selected paging receiver into a composite paging signal such as the paging format as illustrated in FIG. 4.

The paging controller 24 further includes a microcomputer which is coupled to a message memory 27, real time clock 25, a subscriber list device 22, and a voice storage unit 23. The paging controller 24 receives the voice and data information from an entry device, provides the information to encoder 28 for formatting into the composite paging signal having the format of FIG. 4, and sends the composite paging signal to transmitter 26 to be transmitted to a plurality of paging receivers 30-34. For clarity, it is assumed that paging receiver 30 is the selected paging receiver. It is understood that entry device 20 accesses the paging controller 24 to enter the paging receiver's ID (identification number) and messages intended for subsequent transmission. The entry device 21 can be used to enter alphanumeric information and to access and update the subscriber list 22. The subscriber list 22 is a list of all the valid paging receivers' ID's. Filed under each paging receivers ID in the subscriber list are items needed by the paging controller 24 to accept, encode, and transmit paging information. These items include page type, the particular pager address, and the necessity of the activation and deactivation code and other items well known to those of ordinary skill in the art for transmitting paging information to a paging receiver. After the encoder 28 generates the composite paging signal and it is submitted to transmitter 26, the selected paging receiver 30 receives and decodes the composite paging signal to recover the data and voice messages. The pager displays the data message while simultaneously furnishing the voice message to the paging receiver user.

Figure 6:
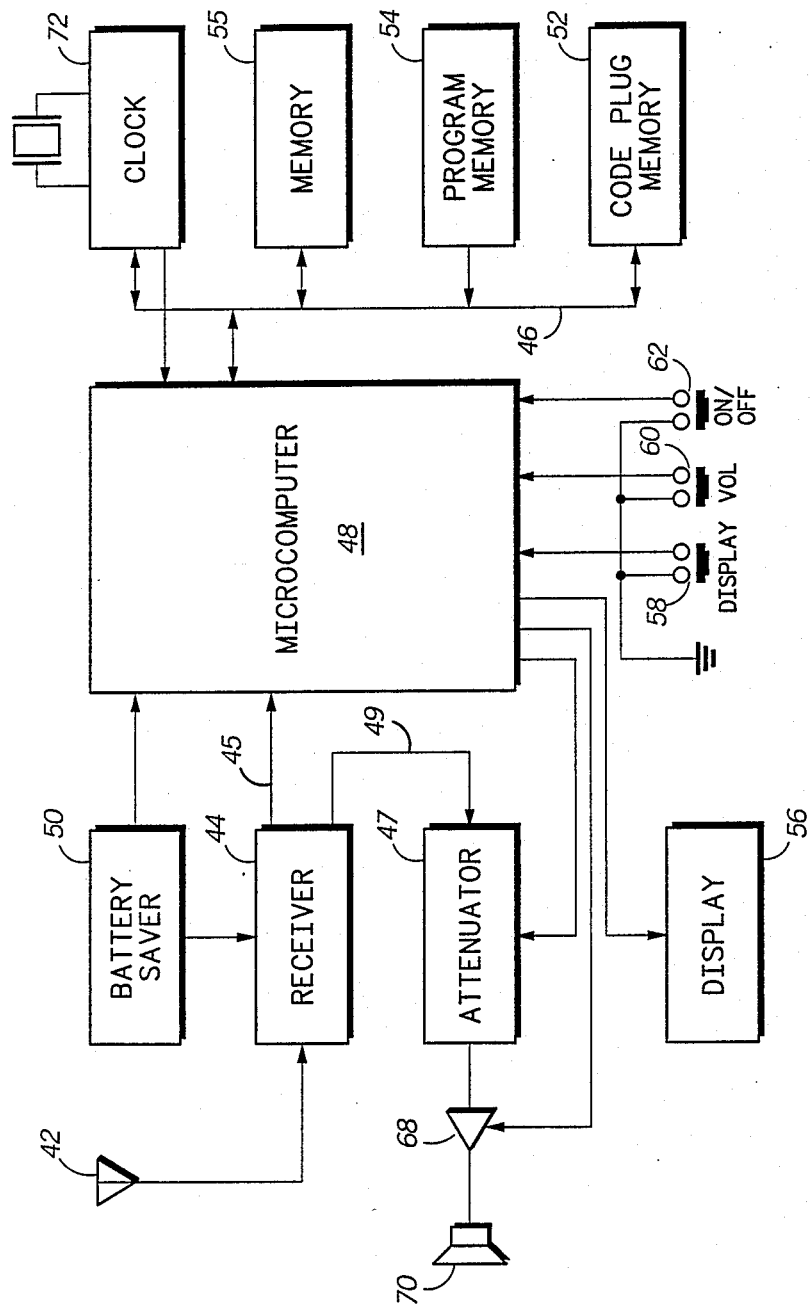
FIG. 6 is a paging receiver according to the present invention for receiving the message format of FIG. 3 for providing a data message to the user simultaneously with a voice message.

FIG. 6 is a functional block diagram of the paging receiver 30 according the present invention. An antenna 42 is shown and coupled to a receiver 44. Receiver 44 detects and demodulates the composite paging signal transmitted from the central controller over a radio frequency communication link. In operation, receiver 44 may use any one of a number of frequency tuning techniques including crystal channel elements or digitized synthesized frequency dividers employed in any of a number of modulation/demodulation formats, including amplitude modulation and frequency modulation.

For the purposes of the present invention, it is easiest to treat the receiver 44 as a well known frequency modulated (FM) receiver which includes channel elements to accurately tune and detect frequency modulated information. However, any number of type of other receivers may be used for generating an appropriate detected RF signal for analysis. A binary output 45 from receiver 44 is applied to an analysis and decoding system known as a decoder. An analog output 49 from receiver 44 is applied to an attenuator 47. More particularly, the binary output 45 from receiver 44 applied to the decoder is fed to a microcomputer 48. While the term "microcomputer" is utilized, it will be appreciated by those skilled in the art that a number of custom programmed logic circuits could be utilized to achieve the same controlling function, such as a program array logic device. As is well known to those familiar with paging receivers, the analog output 49 will contain voice information which is applied to attenuator 47. Under control of microcomputer 48, attenuator 47 applies the voice signal to audio amplifier 68 which feeds speaker 70.

For the purposes of describing the preferred embodiment, the implementation of the paging receiver device employed in the invention will be by software stored in a program memory 54 of the microcomputer-based decoder. Microcomputer 48 includes a common bus 46 which is used to couple to a variety of additional devices. Any number of microcomputers would be suitable, but a preferred device is an MC146805E2 or MC68HC118A8, a microcomputer manufactured by Motorola, Inc.

Microcomputer 48 can control switching on and off receiver 44 to operate receiver 44 on an intermediate basis to extend the life of a battery through battery saver circuit 50. Receiver 44 outputs to microcomputer 48 which includes an address decoder for comparing received address words with an address contained in a code plug memory 52 to determine if the selected paging receiver should be activated for subsequent reception of data and/or voice information. Basically, the code plug memory 52 is operatively coupled to the microcomputer 48 such that when receiver 44 receives paging information in the form of selective calling signals, the microcomputer 48 actuates the code plug memory 52 and reads the unique coded contents thereof. If the received paging code matches the unique paging code stored in memory 52, then the data message associated with the received paging code is stored in an area of memory 55.

It is noted that the paging receiver in FIG. 6 has the capability of recalling data messages stored in message memory 55 and providing them to display 56 for read out according to the state in which a plurality of switches 58-62 are set. More specifically, switch 58 allows the user to read and display a particular memory location in message memory 55. Switch 60 allows the user to vary the volume of speaker 70. Switch 62 is used as an on/off switch.

Continuing our discussion with reference to FIG. 6, microcomputer 48, upon determining that the received address matches the unique data/voice page type stored in code plug memory 52, enables the paging receiver to receive the subsequent voice and data messages to alert the user to prepare for a voice message and to output the voice and data messages. Microcomputer 48 communicates to other elements of the paging receiver through output signals. One of the output signals from the microcomputer 48 is supplied to display 56 to produce an alphanumeric display of the data message on display 56. Other output signals are supplied to attenuator 47 and amplifier 68 to control the output from speaker 70.

A clock signal derived from an oscillator 72 is applied to the microcomputer 48 to control the real time operations of the microcomputer including address decoding and the processing of the data and voice messages. It is understood that microcomputer 48 uses the clock signals supplied by oscillator 72 as is well known in the art for controlling internal operations as well as interfacing with other elements of the paging receiver 30. The microcomputer 48 is further coupled by data bus 46 to message memory 55. Message memory 55 includes a plurality of message storage areas and is adapted to store the data messages which microcomputer 48 converts from the received composite paging signal. Programs or routines to operate microcomputer 48 according to the present invention are stored in program memory 54 and are explained generally with respect to FIGS. 8 and 11.

Referring generally to FIGS. 7-8 and 10-11, there is shown flow diagrams to operate the encoder in the central controller and the decoder in the paging receiver. In a first embodiment of the present invention, an activation code and deactivation code are used to distinguish the start of the voice alert time period and the end of the voice message. Remember that the data message is sent during a first predetermined time period such as the alert time period of the voice message. In a second embodiment of the present invention, the activation code and deactivation code are eliminated. However, this necessitates sending the voice message during a second predetermined time period. Thus, the length of the data message (transmission time) is limited in the first and second embodiment by the first predetermined time period while the length of the voice message (transmission time) is limited in the second embodiment by the second predetermined time period.

Figure 7A:
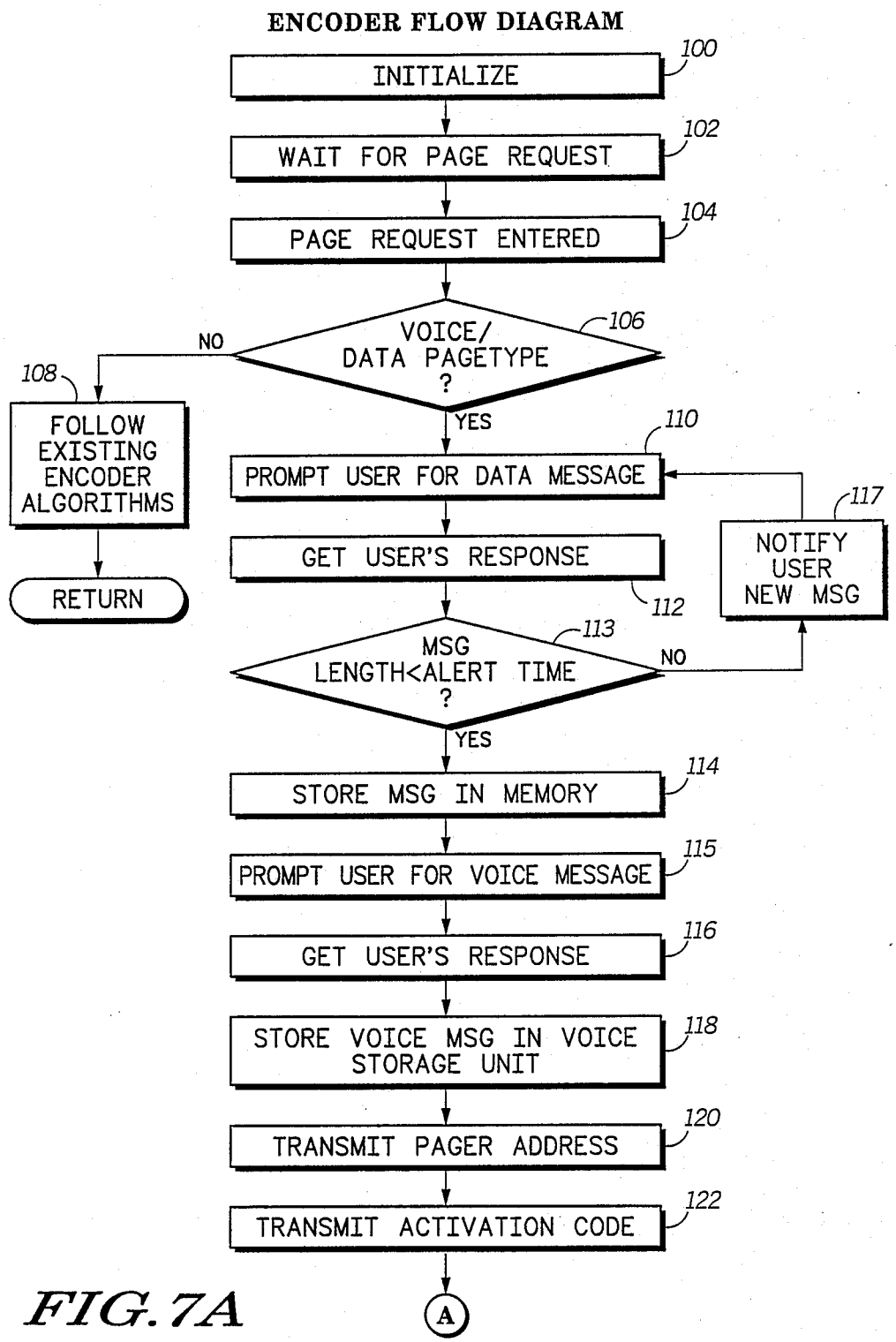
FIGS. 7A-B are flow diagrams for the encoder as shown in FIG. 5 for a first embodiment according to the present invention for transmitting a data message along with a variable length voice message to the same pager.
Figure 7B:
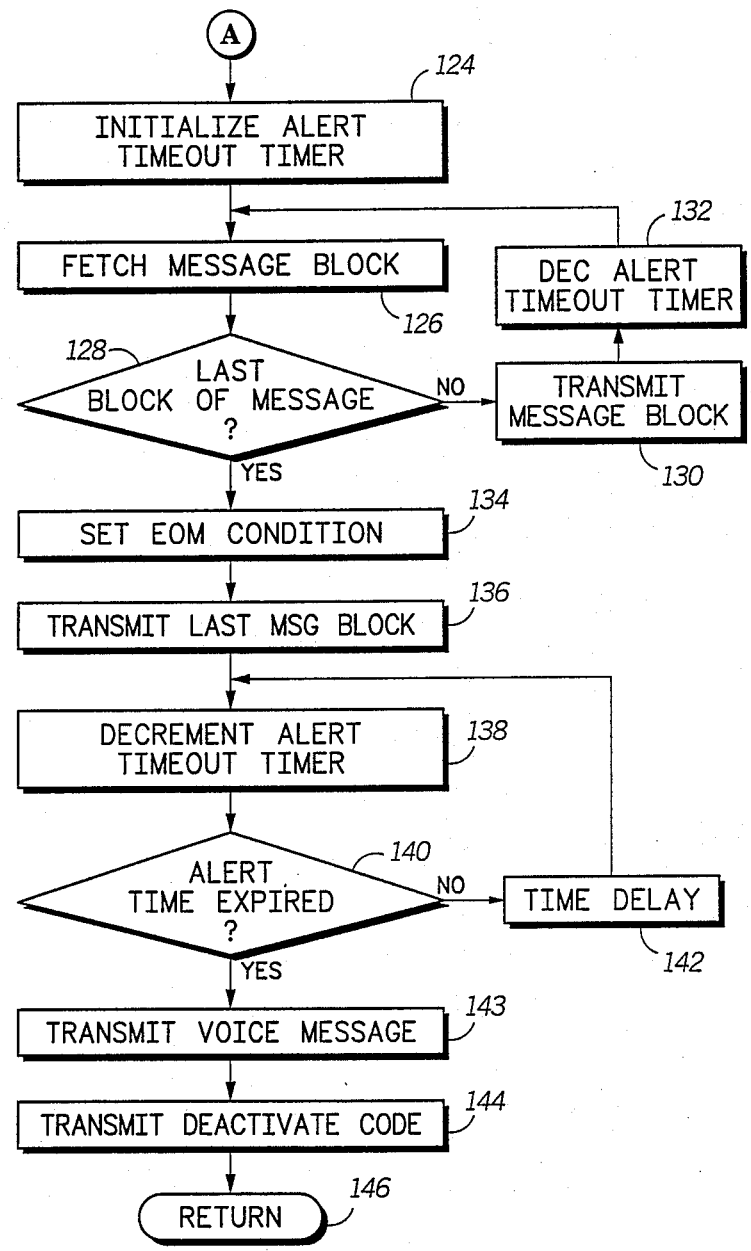

Referring now to FIG. 7, there is illustrated a flow chart diagram for the first embodiment according to the present invention for the encoder in the paging controller to receive, process, and transmit an input message from an entry device. The operating software for the encoder is stored in a memory device coupled to the encoder.

Referring to FIG. 7, initially the encoder is powered up and housekeeping techniques well known in the art are performed to initialize the buses and peripheral equipment connected to the encoder, step 100. The encoder is then placed in a condition for the reception of information from at least one of the entry devices, step 102. Eventually, an entry device user accesses the paging controller and a page request is entered into the system, step 104. The encoder then queries the entry device user for the paging receiver's ID and page type, step 106. The entry device user may respond by signifying one of the page types as illustrated in FIG. 1 in which existing encoder algorithms are utilized to process the page request. These processes are well known to those of ordinary skill in the art and are not repeated here, step 108. If the entry device user signifies that this is a voice/data page type, the encoder is vectored to the voice/data page type routine, step 106. The encoder prompts the entry device user to input the data message from the entry device, such as a telephone number or other alphanumeric information, step 110. At this point, if a PBX system is interfaced between the entry device and the paging controller, the telephone number can be automatically provided to the paging controller by the PBX system. This eliminates the necessity of the user inputting the telephone number from the entry device. In any case, the paging controller receives the data message from the entry device.

The encoder then stores the data message either in memory or in a mass storage device for later encoding the information into the composite paging signal having the voice/data format in FIG. 4, step 112. The encoder then determines whether the length of the data message is shorter than the voice alert time period, step 113. If the data message length is longer than the alert time period, the user is notified that the data message will be truncated and permits the user to enter a shorter data message, step 117.

Referring back to step 113, if the data message length is shorter than the voice alert time period, the data message is stored in memory, step 114. The encoder then prompts the entry device user for the voice message, step 115. It is important to note that a variable length voice message may be entered, step 116. The variable length voice message received from the entry device can be stored on an analog tape device, digitized and stored in memory, or digitized and stored in a mass storage device, step 118. The encoder will eventually encode the data message received in step 112 and the voice message received in step 116 into a composite paging signal having the voice/data format as illustrated in FIG. 4.

To properly encode the message, the encoder first determines from the subscriber list included in the encoder memory the pager address to transmit the information, step 120. The encoder then sends to the transmitter the preamble, control word and address. The address is then followed by the activation code for the selected paging receiver, step 122. The encoder then starts an alert timeout timer which corresponds to the voice alert time period for the selected paging receiver, step 124. For purposes of illustration, it is assumed that this voice alert time period is two seconds. The encoder then fetches a portion of the data message in the form of a message block from the message memory, step 126. The encoder then determines whether this is the last message block of the data message, step 130. If not, the message block is transmitted and the alert timeout timer is decremented, steps 130-132. If this is the last message block, an end-of-message condition is placed at the end of the last message block, step 134. The last message block and the end-of-message condition are transmitted, step 13. The encoder then waits for the alert timeout timer to expire, steps 138-142.

After the alert timeout timer expires, the variable length voice message is transmitted to the selected paging receiver, step 143. After the variable length voice message is transmitted, the deactivation code is transmitted, step 144. This deactivates the pager and the encoder returns to wait for another page request from one of the entry devices, step 146.

Figure 8A:
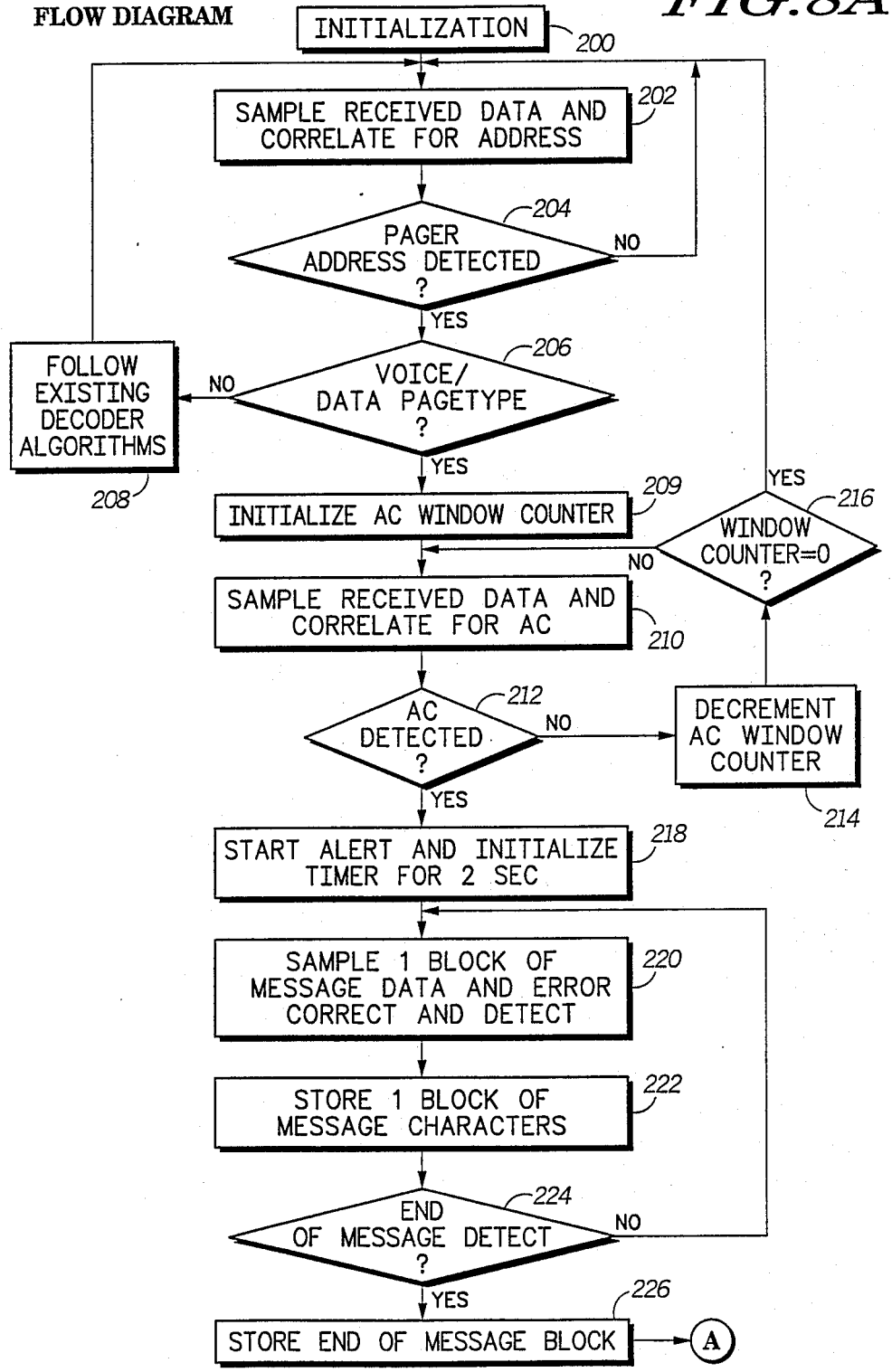
FIG. 8A and FIG 8B are decoder flow diagram for the apparatus as shown in FIG. 6 according to the present invention for receiving a data message along with a variable length voice message.
Figure 8B:
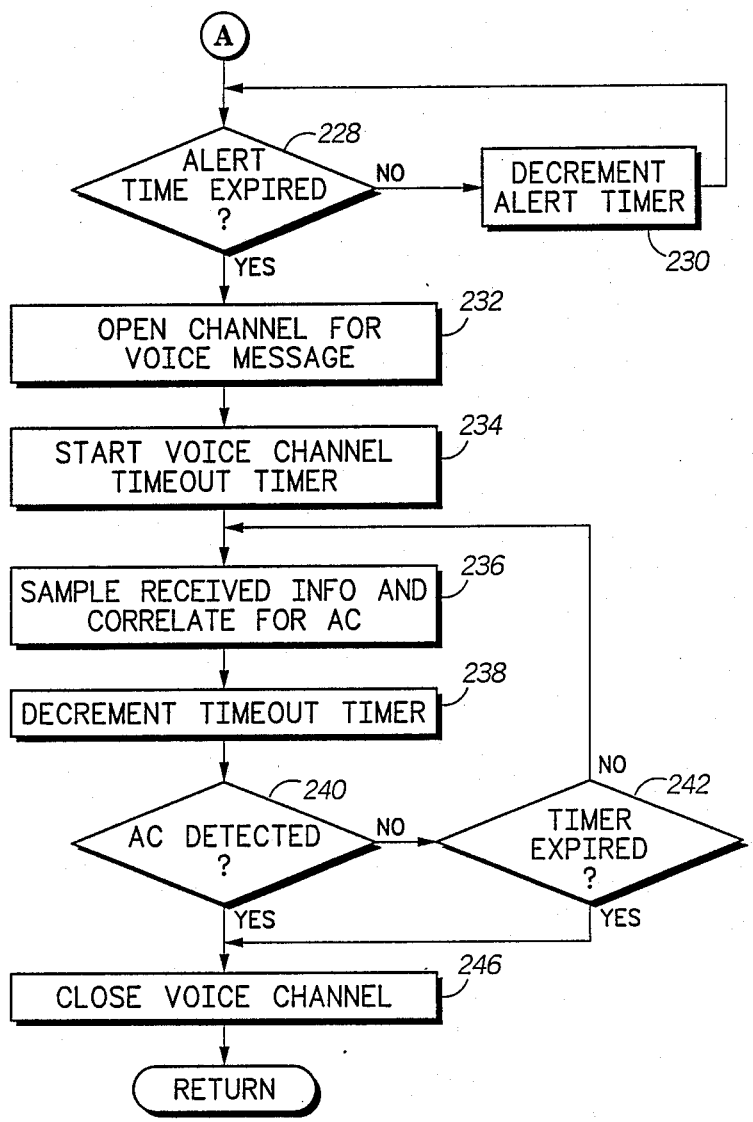

Referring now to FIG. 8, there is shown a flow diagram for a paging receiver with the capability to receive the composite paging signal including the data message and voice message. Initially, the paging receiver is powered up and housekeeping techniques well known in the art are performed to initialize the buses and peripheral equipment connected to the microcomputer, step 200. The microcomputer is then placed in a condition for the reception of selective call signals. Briefly, as is well known, the microcomputer samples the received data and correlates for preamble detect. If the preamble is not detected, the paging receiver may be shut down for a predetermined amount of time if operating in a battery saving environment. If the preamble is detected, the microcomputer is instructed to correlate for the control word. If the control word is not detected within a predetermined time, this may indicate some type of fault condition, and the microcomputer is instructed to look for preamble or is shut down for battery saving. Eventually, the preamble and control word are found and the microcomputer decoder is instructed to correlate for address, step 202. If the address is not detected within a predetermined time, the microcomputer is returned to preamble detect state. Eventually, an address for the selected paging receiver is detected and it is determined whether the address corresponds to the voice/data format, step 206. If the address does not correspond to the voice/data format (hereinafter referred to as voice/data address), the decoder follows existing decoder algorithms for decoding either voice, tone or data which is well known to those of ordinary skill in the art, step 208.

Referring back to step 206, if the voice/data address is detected, the decoder initializes an activation code window counter, step 208. The activation code window counter allows the decoder to search for the activation code for a predetermined period of time corresponding to the value used to initialize the window counter. The decoder then samples the received data to correlate for the activation code, step 210. If the correlation is negative, the activation error window counter is decremented, steps 212 and 214. If the window counter times out, this corresponds to a missed page or other problem and the paging receiver is returned to the initialized state, step 216. Referring back to step 216, if the window counter is not timed out, the decoder continues to sample the received data to correlate for the activation code, steps 210-214.

Referring back to step 212, eventually the activation code is detected and the pager initializes a voice alert timer corresponding to the time that an alert is generated to notify the user of the impending receipt of voice information, step 218. This voice alert time period can typically be approximately two seconds. As the alert is generated, the decoder realizes that data has been transmitted during the voice alert time period and samples one block of message data and checks the validity of the data, step 220. The correction and detection of errors in data messages in a GSC code is well known to those of ordinary skill in the art. After the one block of message data has been error corrected, the data is stored in memory, step 222. The decoder then checks for an end-of-message and if not present, continues to sample the message data and storing it in sequential locations of memory. Eventually, an end-of-message condition is detected and the decoder stores the end-of-message condition in memory, step 226. The end-of-message condition is used by the microcomputer to stop decoding and to determine the end of the data stored in memory. The voice alert timer is then checked to determine whether the voice alert timer has expired, step 228. If the voice alert timer has not expired, the voice alert timer is decremented, step 230, and the voice alert timer is checked again.

Referring back to step 228, eventually the alert timer expires and the audio channel on the paging receiver is opened for a voice message, step 232. A voice channel timeout timer is started to insure that if the deactivation code is not detected after the variable voice message, that the voice channel is eventually shut down, step 234. The voice message is then provided to the paging receiver user and the decoder samples the voice message to detect the deactivation code, step 236. The voice channel timeout timer is then decremented, step 238. It is then determined if the deactivation code has been detected, step 240. If the deactivation code is not detected and the voice channel timeout timer has not expired, the channel remains open to provide the remainder of the voice message to the paging receiver user, step 242. If the deactivation code is detected or the voice channel timeout timer expires, the voice channel is closed, step 246. The decoder then returns to the initialization state to await further paging information from the base station.

As is evident from the discussions of FIGS. 7 and 8, a variable length data message within the voice alert time period and a variable length voice message can be sent to a unique address of a multi-addressable paging receiver. The data is simultaneously displayed as the paging receiver user listens to the audio output from the voice message.

Figure 9:
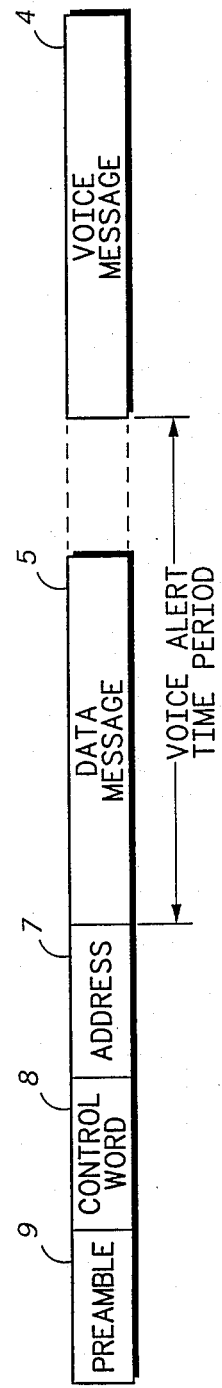
FIG. 9 illustrates a second embodiment according to the present invention for sending a data message along with a voice message having a predetermined length.
Figure 10:
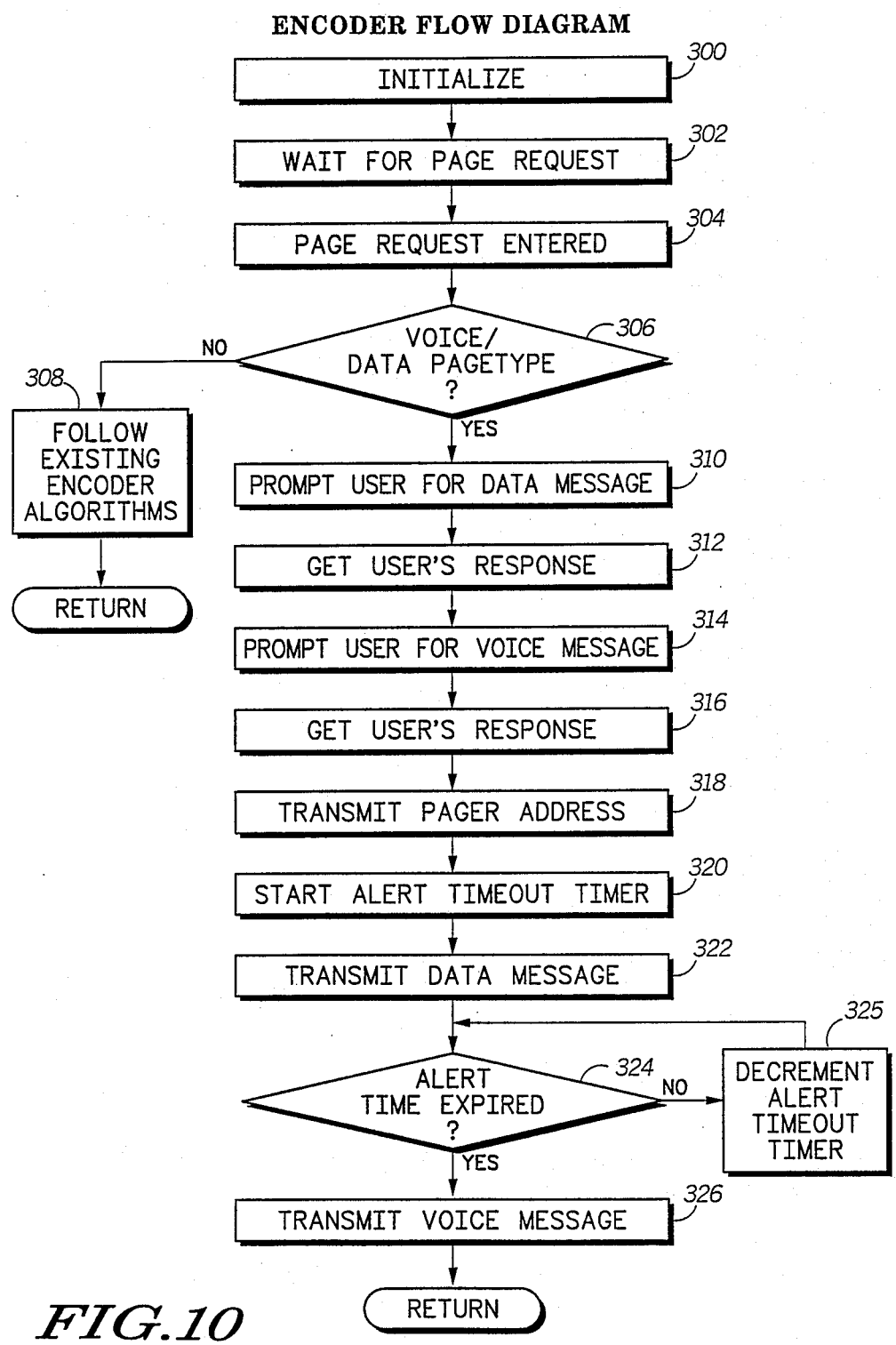
FIG. 10 illustrates a flow diagram for the encoder according to the present invention for the second embodiment which illustrates sending a data message along with a voice message having a predetermined length.
Figure 11:
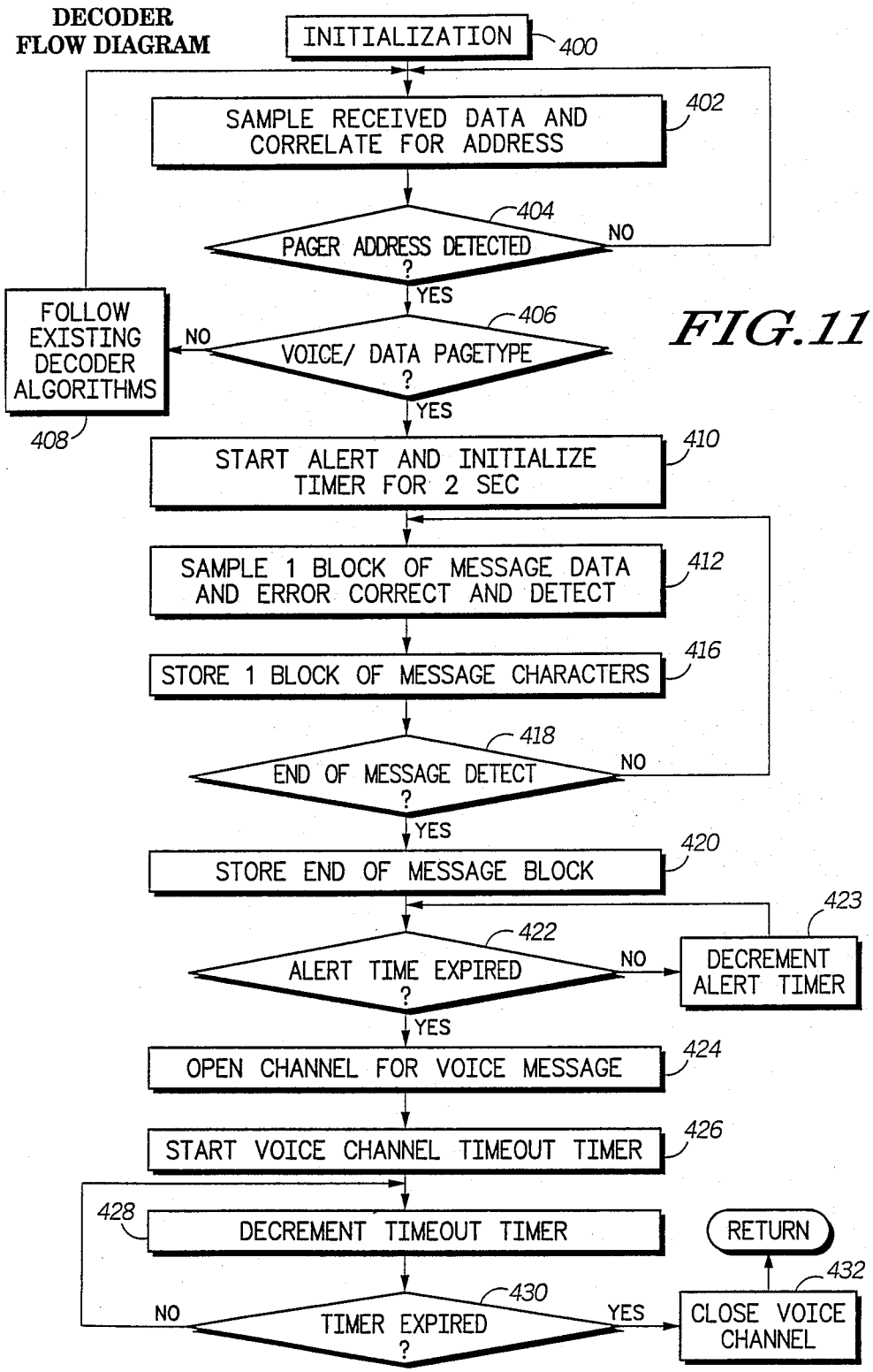
FIG. 11 is a flow diagram for a decoder for receiving the data message and predetermined length voice message transmitted by the encoder having the flow diagram as illustrated in FIG. 10.

Referring now in general to FIGS. 9-11, there is shown a second embodiment of the present invention which eliminates the activation code and deactivation code for the voice/data message format shown in FIG. 9. The second embodiment allows the data message to be displayed along with the voice message, however, the data message and voice message occur at predetermined times in the voice/data format. As is evident in FIG. 9, the voice/data format includes the preamble, followed by the control word, address data message and voice message.

Referring now to FIG. 10, there is shown a flow diagram for the encoder to produce the voice/data format for the composite paging signal of FIG. 9. Initially, the encoder is powered up and housekeeping techniques well known in the art are performed to initialize the buses and peripheral equipment connected to the encoder, step 300. The encoder is then placed in a condition for the reception of information from one of the entry devices, step 302. Eventually, an entry device user accesses the paging controller through one of the entry devices, and a page request is entered into the paging system, step 304. The encoder then queries the entry device user to determine the page type, step 306. The entry device user may respond by signifying one of the page types as illustrated in FIG. 1 in which existing encoder algorithms are used to process the page request. These processes are well known to those of ordinary skill in the art, step 308. If the entry device user signifies that this is a voice/data page type shown in FIG. 9, the encoder is vectored to the voice/data page type routine, step 306. The encoder prompts the entry device user to input the data message from the entry device. The data message may be a telephone number or other alphanumeric information entered from the entry device. If a PBX system is included, the PBX system can automatically supply the telephone number.

The encoder then stores the data message in memory for later encoding the information into the voice/data page format. The encoder receives the data and stores it in the memory, step 312. The encoder then prompts the entry device user for the voice message, step 314. The voice message received from the entry device is stored on an analog tape device or digitized and stored in memory, step 316. The encoder will eventually encode the data message received in step 312 and the voice message received in step 314 into the voice/data page format as illustrated in FIG. 9. The encoder then determines via the subscriber list included in the encoder memory the pager address to transmit the information. The encoder then sends to the transmitter the preamble, control word and address, step 318. The encoder then starts the alert timeout timer which corresponds to the voice alert time period for the selected paging receiver, step 322. The encoder then transmits the data message to the selected receiver, step 324. The encoder then waits for the alert timeout timer to expire, step 324. After the alert timeout timer expires, the voice message is transmitted to the selected paging receiver, step 326. The encoder then returns to wait for another page request from one of the input devices.

Referring now to FIG. 11, there is shown a flow diagram for the operation of the paging receiver to receive a data message and a voice message which follows the unique address which corresponds to the voice/data page type. Initially, the paging receiver is powered up and housekeeping techniques well known in the art are performed to initialize the buses and peripheral equipment connected to the microcomputer, step 400. The microcomputer is then placed in a condition for the reception of information by sampling the received data to correlate for the address of the paging receiver, step 402. If the address detected is not for the particular paging receiver, the paging receiver returns to sample more data to detect its address or may be shut down for a predetermined amount of time if operating in a battery saving environment, step 404. Eventually, an address for the selected paging receiver is detected and it is determined whether the address corresponds to the voice/data page type of FIG. 9, step 406. If the address is not the voice/data address, the decoder executes existing decoder algorithms for either voice, tone, or data decoding well known to those of ordinary skill in the art, step 408.

Referring back to step 406, if the address detected is a voice/data address, a voice alert for the paging receiver is started and a voice alert timeout timer is initialized for a predetermined time, such as two seconds, step 410. The decoder then samples a block of message data and corrects any errors in the data, step 412. The decoder then stores the block of message characters in memory, step 416. If an end-of-message condition is detected, the storage of data is terminated, step 418. If an end-of-message condition is not detected, the decoder continues sampling and storing characters as received.

Eventually, an end-of-message condition is detected and the end-of-message condition is stored in memory to signify the end of the message in memory, step 420. The decoder then waits for the alert timeout timer to expire, step 422. Eventually, the decoder timer times out and the decoder displays the data message and opens the audio channel for the voice message which follows the data message, step 424. Since a deactivation code is not sent, the paging receiver starts a voice channel timeout timer, step 426. The decoder then decrements the voice channel timeout timer 428. If the voice channel timeout timer has not expired, the decoder continues to decrement the voice channel timeout timer, step 428. Eventually, the voice timeout timer expires and the decoder closes the voice channel, step 432. The decoder then returns to sample new received data for address correlation, step 407. As is evident, the paging receiver does not need the deactivation code, however, the audio channel remains open for a predetermined time whether or not the voice message is present.

Thus, there has been shown a method and system for transmitting a data message and voice message to a unique address of a selected paging receiver. In a first embodiment of the present invention, the paging system uses an activation and deactivation code to notify the pager of the presence of the voice and data messages. In a second embodiment of the present invention, the data message is sent at a first predetermined time followed at a second predetermined time by the voice message.

What is claimed is:

1. A paging system for transferring a voice related data message within a tone and voice selective call paging signal to a paging receiver, said system comprising:
   a paging controller for receiving mutually related voice and data information from an entry device;
   an encoder responsive to said paging controller for encoding the related voice and data information into corresponding voice and data messages, wherein the data and voice messages are combined into a tone and voice selective call paging signal designated for at least one unique paging receiver, wherein said tone and voice paging signal includes a predetermined time period followed by the voice message and an activation signal for notification of the start of said predetermined time period, and further wherein the related data message is included within the predetermined time period;
   a transmitter, being responsive to said encoder, for transmitting said tone and voice selected to call paging signal including said voice related data message to the paging receiver;
   a receiving means included in the paging receiver for receiving said tone and voice selective call paging signal;
   a decoding means, being responsive to said receiving means, for decoding the received tone and voice selective call paging signal to recover the mutually related data and voice messages and activation signal thereof;

processing means, being responsive to said decoding means and notified of the start of the predetermined time period by the recovered reactivation signal, for processing said recovered related data and voice messages to generate respectively an alphanumeric information signal and voice information signal;

display means, being responsive to said processing means, for visually displaying on said display means, alphanumeric characters corresponding to the alphanumeric information signal; and speaker means, being responsive to said processing means, for producing audible sounds corresponding to the voice information signal wherein a voice alert is generated during the predetermined time period and further wherein the data message is received during the predetermined time period.

2. The paging system of claim 1, wherein said data message includes numeric information.

3. The paging system of claim 2, wherein said numeric information includes a telephone number corresponding to a sender of the related voice message.

4. The paging system of claim 3, wherein said paging system further includes a device for automatically entering the telephone number into the paging controller.

5. The paging system of claim 1, wherein the paging receiver further includes a memory means being responsive to said processing means for storing the data message.

6. The paging system of claim 1, wherein the alphanumeric characters are disposed simultaneously with audible sounds corresponding to the voice information signal.

7. The paging system of claim 1, wherein the tone and voice selective call paging signal includes a deactivation signal for notifying the processing means of the end of the voice message.

8. A central controller for transferring a voice related data message within a tone and voice selective call paging signal to communication receiver, said central controller comprising:

a paging controller for receiving mutually related voice parts and data information from an entry device;

an encoder responsive to said paging controller for encoding the related voice and data information into corresponding voice and data messages, wherein the data and voice messages are combined with a tone and voice selective call paging signal designated for at least one unique communication receiver, wherein the tone and voice paging signal includes a predetermined time period followed by the voice message and an activation signal for notification of the start of said predetermined time period, and wherein the related data message is included within the predetermined time period; and a transmitter, being responsive to said encoder, for transmitting said tone and voice selective call paging signal including said voice related data message to the paging receiver.

9. The central controller of claim 8, wherein said data message includes numeric information.

10. The central controller of claim 9, wherein said numeric information includes a telephone number corresponding to a sender of the related voice message.

11. The central controller of claim 10, wherein the entry device automatically provides the telephone number to said paging controller.

12. The central controller of claim 8, wherein the tone and voice selective call paging signal includes a deactivation signal for indicating the end of the voice message.

13. A paging receiver for receiving a voice related data message within a tone and voice selective call paging signal intended for the paging receiver, the tone and voice selective call paging signal having a predetermined time period including a data message followed by a mutually related voice message and an activation signal for notification of the start of said predetermined time period, said paging receiver comprising:

a receiving means for receiving said tone and voice selective call paging signal including said voice related data message;

a decoding means, being responsive to said receiving means, for decoding the tone and voice selective call paging signal to recover the mutually related data and voice messages and activation signal thereof;

processing means, being responsive to said decoding means and notified of the start of the predetermined time period by the recovered activation signal, for processing the recovered related data and voice messages to generate respectively an alphanumeric information signal and voice information signal;

display means, being responsive to said processing means, for visually displaying on said display means, alphanumeric characters corresponding to the alphanumeric information signal; and speaker means, being responsive to said processing means, for producing audible sounds corresponding to the voice information signal.

14. The paging receiver of claim 13, wherein said data message includes numeric information.

15. The paging receiver of claim 14, wherein said numeric information includes a telephone number corresponding to a sender of the related voice message.

16. The paging receiver of claim 13, wherein the paging receiver further includes a memory means for being responsive to the data processing means for storing the data message.

17. The paging receiver of claim 16, wherein the data processing means is comprised of a microprocessor having a predetermined set of instructions for effecting the processing of the data message and voice message.

18. The paging system of claim 13, wherein the alphanumeric characters are displayed simultaneously with audible sounds corresponding to the voice information signal.

19. The paging receiver of claim 13, wherein the tone and voice selective of call paging signal includes a deactivation signal for notifying the processing means of the end of the voice message.

* * * * *

UNITED STATES PATENT AND TRADEMARK OFFICE
CERTIFICATE OF CORRECTION

PATENT NO. : 4,885,577

DATED : December 5, 1989

INVENTOR(S) : Leonard E. Nelson

It is certified that error appears in the above-identified patent and that said Letters Patent is hereby corrected as shown below:

Column 12, line 58, delete "selected to call" and substitute --selective call--.

Column 13, line 45, delete "parts".

Column 13, line 51, delete "with" and substitute --into--.

Column 14, line 61, delete "of".

Signed and Sealed this

Twenty-third Day of October, 1990

Attest:

HARRY F. MANBECK, JR.

Attesting Officer

Commissioner of Patents and Trademarks